United States Patent [19]

Lesser

[11] Patent Number: 5,756,185
[45] Date of Patent: May 26, 1998

[54] GLUABLE FIXING ELEMENT FOR HOLDING STRUCTURAL OR FUNCTIONAL COMPONENTS ON CARRIER PARTS

[75] Inventor: Hans-Jürgen Lesser, Rheinfelden, Germany

[73] Assignee: A. Raymond & GmbH & Co. KG, Lorrach, Germany

[21] Appl. No.: 380,518

[22] Filed: Jan. 30, 1995

[30] Foreign Application Priority Data

Jan. 28, 1994 [DE] Germany ............ 44 02 550.5

[51] Int. Cl.$^6$ .................................................. B32B 23/02
[52] U.S. Cl. ................ 428/192; 24/304; 24/289; 428/413; 428/344; 428/356; 428/346; 428/358; 428/360
[58] Field of Search ................... 428/413, 192, 428/343, 344, 349, 346, 356, 458, 460, 31; 24/304, 289, 293, 297

[56] References Cited

U.S. PATENT DOCUMENTS

| | | | |
|---|---|---|---|
| 3,399,435 | 9/1968 | Ackerman, Jr. | 16/2 |
| 3,678,980 | 7/1972 | Gutshall | 411/82 |
| 3,798,403 | 3/1974 | Mitchell et al. | 219/633 |
| 4,250,596 | 2/1981 | Hara et al. | 24/289 |
| 4,853,075 | 8/1989 | Leslie | 156/584 |
| 5,081,798 | 1/1992 | Clasen | 51/273 |

FOREIGN PATENT DOCUMENTS

| | | |
|---|---|---|
| 1164793 | 1/1957 | France. |
| 1233838 | 10/1960 | France. |

*Primary Examiner*—E. Rollins Buffalow
*Attorney, Agent, or Firm*—Finnegan, Henderson, Farabow, Garrett & Dunner, L.L.P.

[57] ABSTRACT

A gluable fixing element for holding structural or functional components to essentially flat surfaces of carrier parts. It consists of a bonding portion for producing an adhesive bond with the surface of the carrier part and at least one further holding portion for producing a positive or non-positive connection with the component. The bonding portion has a bonding surface which is provided with a curable and/or crosslinkable, reactive hot-melt adhesive that when dry is wear-resistant and non-adhesive at temperatures up to 80° C. but that can be reactivated within a very short time when heated by thermal or other energy to a temperature sufficient to melt the adhesive to produce a durable adhesive bond between the element and the carrier parts.

7 Claims, 1 Drawing Sheet

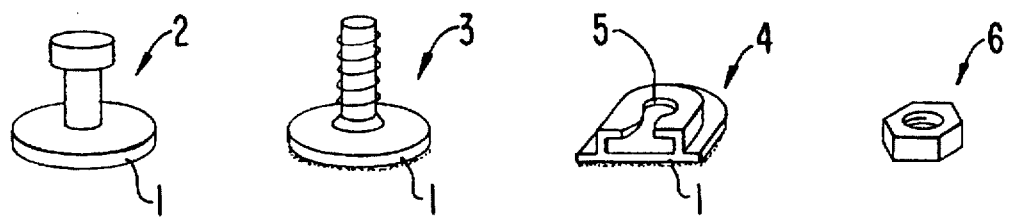
FIG. I(a) FIG. I(b) FIG. I(c) FIG. I(d)
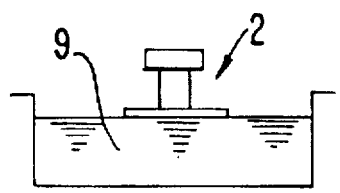 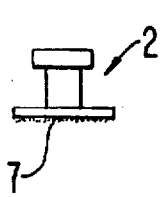 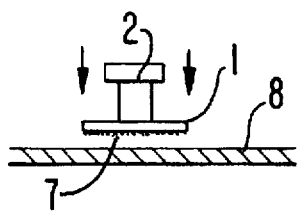
FIG. 2   FIG. 3   FIG. 4
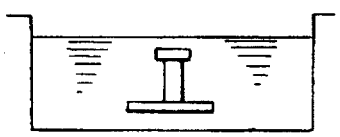 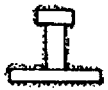 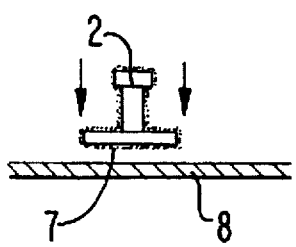
FIG. 5   FIG. 6   FIG. 7
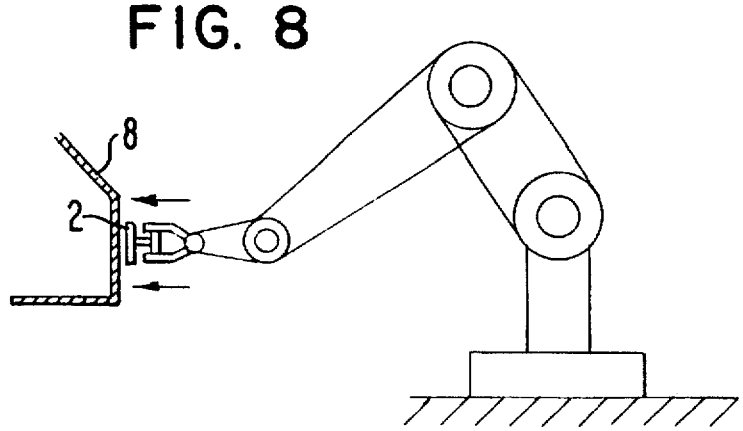 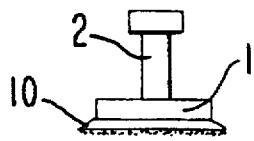
FIG. 8   FIG. 9

GLUABLE FIXING ELEMENT FOR HOLDING STRUCTURAL OR FUNCTIONAL COMPONENTS ON CARRIER PARTS

BACKGROUND OF THE INVENTION

This invention relates to a gluable fixing element for holding structural or functional components on carrier parts. In particular, it relates to fixing elements used in motor vehicle construction for fixing protective or decorative strips, lines, nuts or other fixing elements to the vehicle. The gluing of the fixing elements to the sheet metal body is intended to avoid the disadvantages which arise due to local stresses in the sheet metal that occur during conventional fixing in punched fixing holes or by the welding of fixing bolts or nuts to the sheet metal.

French Patent No. 2,542,829 discloses such a fixing element in which an adhesive bond is achieved by a two-sided adhesive tape, the outward-pointing bonding surface of the tape being initially covered by a thin film so that the bonding surface becomes effective only after the film has been removed. Apart from the fact that the removal of the protective film is laborious, the adhesive bond also does not, as experience has shown, achieve the holding force required for a durable bond between a protective strip and the car body's surface. There is also the risk of the protective film being damaged during transport and of the components then sticking to one another. This type of adhesive fixing evidently has hot proven suitable in motor vehicle construction and is therefor little used.

It is an object of the present invention to provide the above-mentioned fixing elements with an adhesive layer which has a substantially better adhesive effect than the adhesive tapes hitherto provided and which additionally are made in such a way that the fixing elements do not stick together while packaged, but their adhesive effect or adhesive function can be activated at any time at the point of use.

SUMMARY OF THE INVENTION

According to the invention, this object is achieved by providing a gluable fixing element for holding structural or functional components to essentially flat surfaces of carrier parts, the element comprising a bonding portion for bonding with the surface of a carrier part and at least one holding portion for securing a component to the element, the bonding portion having a bonding surface compatible with the surface of the carrier part, and a curable and heat reactive, hot-melt adhesive affixed at least to the bonding surface, the adhesive when dry being wear-resistant and non-adhesive at temperatures up to about 80° C. and being activatable to provide an adhesive bond between the element and the carrier part upon being heated to a temperature sufficient to melt the adhesive.

The fixing element provided with such a layer of adhesive has the advantage that the layer of adhesive is non-tacky and resistant to adhesion until the fixing element is to be used. It is only by the reactivation of the hot-melt adhesive at the point of use that the adhesive forces of the adhesive layer are activated, leading to a virtually unbreakable bond after appropriate curing.

BRIEF DESCRIPTION OF THE DRAWINGS

In the drawings, various examples of the fixing elements according to the invention and the individual processing steps up to the intended use are shown, and they are described in more detail below. In the drawings:

FIGS. 1a) to 1d) show four different embodiments of gluable fixing elements according to the invention;

FIG. 2 shows a fixing element during dipping of its bonding surface into a bath of hot-melt adhesive;

FIG. 3 shows the same fixing element during the drying of the hot-melt adhesive;

FIG. 4 shows the fixing element in the position of being pressed onto a carrier plate while the bonding surface is melting;

FIG. 5 shows a fixing element fully immersed in a dipping bath of hot-melt adhesive;

FIG. 6 shows the fixing element, enveloped by adhesive on all sides, during drying;

FIG. 7 shows the same fixing element in the position of being pressed onto a carrier plate during melting, according to FIG. 4;

FIG. 8 shows the gluing of a fixing element to a carrier plate by means of a robot arm; and FIG. 9 shows a fixing element with a bonding plate, having a thickness of material which decreases towards the edge zones.

DETAILED DESCRIPTION OF THE INVENTION

In FIGS. 1a) to 1d), four typical gluable fixing elements are shown that are used in motor vehicle construction for holding decorative or functional components to the vehicle. These fixing elements are each provided with a plate 1 for holding and making an adhesive bond with the surface of a carrier part, for example the sheet metal part of the body of the vehicle.

A holding region 2, 3, 4 or 6 for making a positive connection with a decorative or functional component is in each case integrally molded to the plate 1. In the case of the holding region of the element of FIG. 1a) this is a so-called head bolt 2. In FIG. 1b) it is a so-called threaded bolt 3. In FIG. 1c) it is a holding plate 4 having a key-hole 5 which is open at the side and into which a head bolt projecting from another component or fixing clip can be engaged. In FIG. 1d) it is a nut 6.

On the underside intended for carrying the adhesive bond, the plate 1 is provided or coated with a curable or crosslinkable, single-component, highly reactive hot-melt resin adhesive which has a structure based on specific backbone binders, and which has the property of being non-tacky and wear-resistant at temperatures up to 80° C. This hot-melt adhesive can, however, be reactivated again by supplying heat, it also being possible to generate the heat by other forms of energy such as, for example, ultrasonics, heating elements, microwaves or friction.

To ensure short setting and curing times of the layers of adhesive on the fixing elements, the backbone binders and their curing systems must possess a very high reactivity. Particularly preferred backbone binders are tri-, tetra- and/or poly-functional epoxide resins which cure by means of polyaddition or polymerization. The curing agent systems suitable for this purpose differ from one another in that compounds with at least two active hydrogen atoms in the molecule (for example aliphatic, cycloaliphatic or aromatic amines, dicyandiamides and the like) are used for the polyaddition, and catalytically acting Lewis acids or Brönstedt acids and/or bases—if appropriate in the presence of metal complex compounds—are used for cationic or anionic polymerization.

Further preferred backbone binders such as, for example, unsaturated polyester resins belong to the family of unsaturated polymers. These backbone binders can be caused to set and cure either by a free-radical mechanism with temperature-dependent curing and accelerating systems or by UV radiation in the presence of photoinitiators, and also by electron beams.

The hot-melt adhesive can, for example, be applied to the plate 1 by lowering the fixing element, as shown in FIG. 2, onto the surface of a bath 9 of a hot-melt adhesive and lifting it again. The layer 7 of adhesive adhering to the underside of the plate must then be dried. Afterwards, the fixing elements can be packaged and transported to their destination without the risk of them sticking together.

To create an adhesive bond with the surface of a carrier part 8, which can, for example, be the sheet metal part of a motor vehicle body, the fixing element with an adhesive layer 7 affixed thereto is heated to 150°–180° C. while it is being held just above and parallel to the carrier plate 8 by a suitable heating means, such as a directed stream of hot air (not shown). After softening or melting of the adhesive, it is pressed onto the carrier plate 8 until the hot-melt adhesive starts to cure. For further curing of the layer of adhesive, the drying oven required for the subsequent painting of the car's body can be utilized.

The heat required for reactivating the hot-melt adhesive can be produced, for example, by using ultrasonics, high-energy radiation, heating elements or by friction between the carrier surfaces and the bonding surface.

The positioning and pressing-on of the fixing element can be advantageously carried out by means of an industrial robot which is diagrammatically indicated in FIG. 8.

The fixing elements according to FIGS. 1a)–d) can be made either of metal or of plastic. In the metal version, it is also possible to coat the fixing elements with the layer 7 of an adhesive by immersing it in a dipping bath of the adhesive, as shown diagrammatically in FIG. 5. Since the fixing element is covered on all sides (FIG. 6) with the adhesive, it is thus at the same time protected against rust. Thus an effective and inexpensive corrosion protection can be obtained at the same time.

The positioning and bonding of the fixing element according to FIG. 7 is carried out in the same way as shown in FIG. 4. In this case, the layer 7 of the adhesive is caused to melt only locally on the underside of the bonding plate 1, so that the remaining part is not affected thereby.

In the case of fixing elements of plastic, the application of the hot-melt adhesive can also be carried out in an injection mold during the course of injection-molding the element, the hot-melt adhesive being applied to the exposed bonding surface after the injection mold has been opened and before the injection-molded parts are ejected, and then being fast-dried by the residual heat of the parts which have not yet fully cooled down. In this way, a further working step for applying the hot-melt adhesive can be saved.

In the fixing element according to FIG. 9, the outer edge of the bonding surface is provided with a thin lip 10 running out in the tip. This avoids stress peaks in the edge zones of the adhesive layers, so that the adhesive effect of the glued fixing element is sufficiently resistant to the effects of lateral forces on the bolt head 2 and to the peeling effect associated therewith. Further, the bonding surface can be designed such that the thickness of the adhesive material decreases towards the edge zones.

The invention is not restricted only to gluable fixing means, but it extends quite generally to the use of the hot-melt adhesive described above to the fitting or coating of other structural or functional components such as, for example, strips, profile rods, sheets of metal or plastic and the like for producing adhesive bonds.

I claim:

1. A gluable fixing element for holding decorative or functional components on a flat surface of a carrier, said fixing element comprising a bonding portion and at least one holding portion for securing a decorative or functional component to the element, said bonding portion of said fixing element having a flat bonding surface to be bonded to said flat surface of said carrier and a hot-melt resin adhesive affixed at least to said bonding surface, said adhesive containing a polyfunctional epoxide resin or an unsaturated polyester resin which cures with a curing agent by polymerization, when dry being wear-resistant and non-adhesive at temperatures up to about 80° C. and being activated when positioned on said flat surface to provide an adhesive bond between said fixing element and said flat surface upon being heated to a temperature sufficient to melt said adhesive.

2. The fixing element of claim 1, wherein the hot-melt adhesive is a polyester resin adhesive.

3. The fixing element of claim 1, wherein the hot-melt adhesive is an epoxy resin.

4. The fixing element of claim 1, wherein the fixing element has an outer surface and said adhesive is affixed to the entire outer surface.

5. The fixing element of claim 1, wherein the bonding portion and the holding portion are made of a plastic material, said adhesive being affixed to said bonding surface of the element during a process of injection molding said element.

6. The fixing element of claim 1, wherein the bonding surface has an outer edge provided with a radially extending lip member which has a radially decreasing thickness.

7. The fixing element of claim 6, wherein the lip member is flat on the bonding surface side of said lip member and has a thickness which tapers radially outward toward said bonding surface side.

* * * * *